United States Patent [19]

Matumoto

[11] Patent Number: 5,723,156
[45] Date of Patent: Mar. 3, 1998

[54] MOLD FOR MOLDING A SEMICONDUCTOR PACKAGE

[75] Inventor: Jirou Matumoto, Tokyo, Japan

[73] Assignee: Oki Electric Industry Co., Ltd., Tokyo, Japan

[21] Appl. No.: 798,153

[22] Filed: Feb. 10, 1997

[30] Foreign Application Priority Data

Jul. 3, 1996 [JP] Japan ................. 8-173156

[51] Int. Cl.$^6$ .................. B29C 45/14; B29C 45/26
[52] U.S. Cl. .................. 425/116; 425/117; 425/544; 425/572; 425/573; 264/272.17; 264/328.12
[58] Field of Search ................. 425/116, 117, 425/121, 544, 572, 588, DIG. 228, 574; 264/272.17, 328.12; 249/91, 95

[56] References Cited

U.S. PATENT DOCUMENTS

| | | | |
|---|---|---|---|
| 5,204,122 | 4/1993 | Konishi | 264/272.17 |
| 5,275,546 | 1/1994 | Fierkens | 425/116 |
| 5,371,044 | 12/1994 | Yoshida et al. | 264/272.17 |

FOREIGN PATENT DOCUMENTS

| | | | |
|---|---|---|---|
| 54-33663 | 3/1979 | Japan | 264/272.17 |

*Primary Examiner*—Khanh P. Nguyen
*Attorney, Agent, or Firm*—Rabin, Champagne, & Lynt, P.C.

[57] ABSTRACT

A mold for molding a semiconductor package which is capable of guiding a resin material for encapsulating a semiconductor device uniformly into the cavity and prevents the island portion of the support member from being exposed from the molding main body, the mold comprising a pair of mold members for encapsulating a semiconductor device held on the support member, and a gate for guiding a molding resin material into the cavity, the gate being provided in the parting face of parting face of at least one of the mold members, wherein the gate is defined by a U-shape groove including the slanted bottom face inclined at an elevation angle toward the cavity to orient the flow of the resin material, supplied to the gate, toward the half of the cavity defined by the other mold member from the gate, and wherein in the slanted bottom face, there is provided an auxiliary groove for making the resin material, generally guided along the slanted bottom face, partially oriented to a direction different from the direction of the resin flow oriented by the slanted bottom face.

10 Claims, 6 Drawing Sheets

MOLD FOR MOLDING A SEMICONDUCTOR PACKAGE

BACKGROUND OF THE INVENTION

1. Field of the Invention

The present invention relates to a mold for a sealing resin and used in the manufacture of a molded semiconductor package such as an IC package.

2. Prior Art

Semiconductor devices, such as an IC chip or LSI, are generally sealed in packages for protection, and mounted in equipment. Resin is used as a packaging material of this kind, and there are resin molded semiconductor packages.

With the general trend toward lighter, thinner, shorter and smaller equipment, progress has been made in reduction of the thickness of molded packages having a semiconductor device sealed in, that is, semiconductor packages.

For the resin materials for molded packages, thermosetting resins are used, and a semiconductor device is encapsulated with a resin material in a mold.

A mold comprises a top mold member and a bottom mold member which are combined with their parting faces in contact with each other. Both mold members cooperatively hold a lead frame member with the parting faces of the mold members so as to define the cavity around an IC chip held on the lead frame member. The top mold member includes a cull for heating a thermosetting resin material to plasticize it. On the other hand, the bottom mold member includes a pot for pre-heating a resin tablet to send the tablet to the cull so as to be further heated and plasticized, runners for transferring the plasticized resin from the cull, and gates for guiding the resin material from the runners to the cavities.

A semiconductor device to be encapsulated by resin molding using a mold has been bonded onto the island portion of the lead frame in the preceding step. The electrode terminals of the semiconductor device are connected through wires to the corresponding lead terminals of the lead frame.

The lead frame is set on the bottom mold member in such a way that the semiconductor device on the lead frame is located substantially in the center of the mold cavity. After the lead frame is set, the lead frame having the semiconductor device bonded thereto is held between parting faces of the top and the bottom mold members. Therefore, the lead frame is so arranged as to substantially divide the cavity into approximately equivalent halves. The plasticized resin passes through the runner and is injected into the cavity from the gate until it is filled. After the filling, the resin pressure in the cavity is maintained at a specified value, and when the resin is cured, the device encapsulation is finished.

Figure 10A:
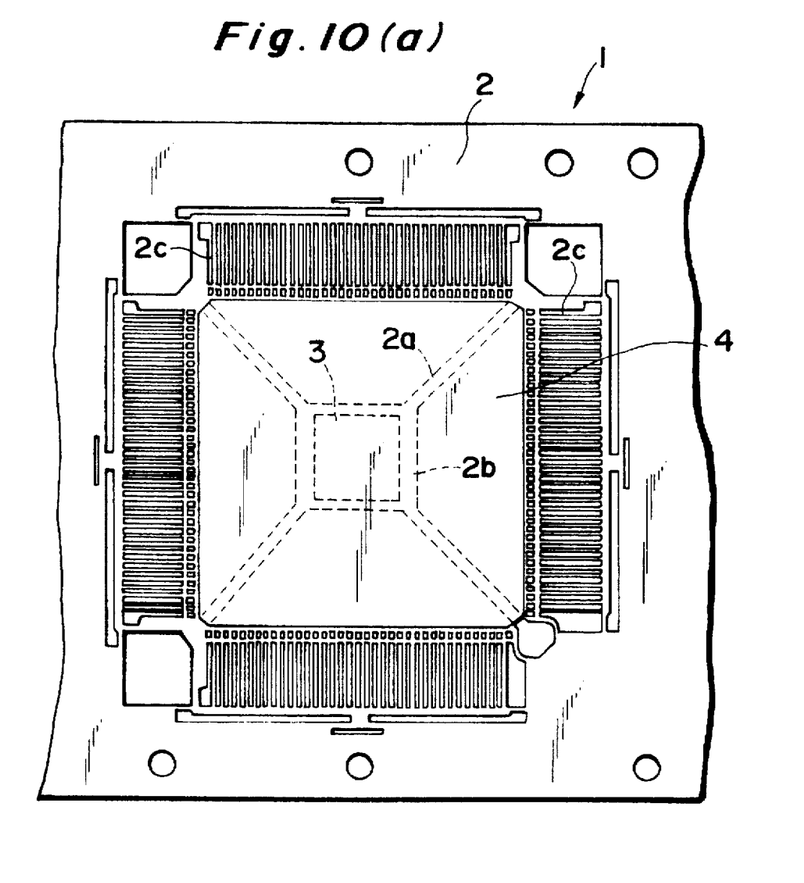
FIG. 10(a) is a plan view of a semiconductor package according to the present invention in its manufacturing process.
Figure 10B:
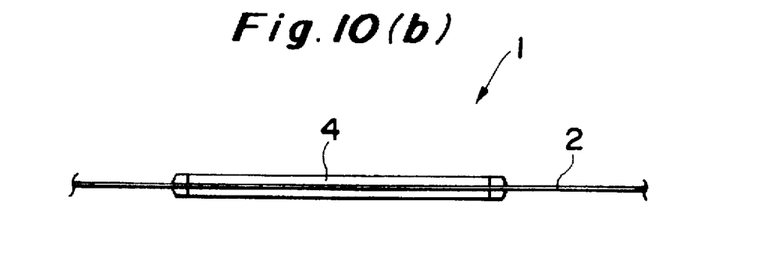
FIG. 10(b) is a front view of a semiconductor package according to the present invention in its manufacturing process.

Subsequently, a lead frame having the semiconductor device covered with the resin material is ejected from a mold, and the resin material cured in the runner and the cull are separated from a molding main body, and a resin-molded semiconductor package is formed as shown in FIG. 10(a). FIG. 10(a) is a plan view of a semiconductor package ejected from the mold, and FIG. 10(b) is a front view of the semiconductor package.

The semiconductor package 1 comprises a lead frame member 2 and an IC chip 3 fixed to the lead frame member 2 as clearly shown in FIG. 10(a). The lead frame member 2 has an island portion 2b supported through the intermediary of support portions 2a, and the IC chip is fixed to the island portion 2b. Respective electrode terminals of the IC chip 3 are connected through bonding wires, not shown, to corresponding lead terminals 2c of the lead frame member 2. A molding 4 of resin is formed so as to cover the IC chip 3 and the bonding wires.

In a conventional mold as described above, the gate provided in the bottom mold member is formed to have a groove with a U-shape cross section defined by a slanted bottom face inclined at an elevation angle as seen in the direction of the cavity from the cull and also by a pair of side faces. The resin material transferred into the cavity along the inclined bottom face of the gate is led smoothly into the cavity, so that the cavity is filled with the resin material without forming voids in the cavity.

However, the resin flow oriented by the inclined bottom face of the gate generally proceeds toward the upper half of the cavity defined by the top mold member. Therefore, out of the resin injected into the cavity from the gate, a larger proportion flows into the upper half of the cavity than into the lower half of the cavity below the level of the lead frame member. Moreover, there is the IC chip-mounted lead frame member intervening between the upper cavity portion and the lower cavity portion.

For this reason, the resin pressure in the upper cavity portion becomes higher than in the lower cavity portion. Accordingly, owing to the resin pressure from the upper cavity portion, the island portion supporting the IC chip is deformed to descend. On account of this, a resulting molded package is sometimes shaped such that the bottom face of the island portion is partially exposed at the reverse side of the molded package.

SUMMARY OF THE INVENTION

An object of the present invention is to provide a mold for molding a semiconductor package, which can distribute a resin material for sealing a semiconductor uniformly in a cavity and which prevents an island portion of the support member from being exposed from a molding main body.

According to the present invention, there is provided a mold for molding a semiconductor package comprising a pair of mold members for cooperatively holding therebetween a plate-form support member to retain a semiconductor device thereon and cooperatively defining a cavity surrounding the semiconductor device, the pair of mold members having parting faces in contact with each other, and a gate for guiding a resin molding material into the cavity, the gate being formed in the parting face of at least one of the pair of mold members, wherein the gate is defined by a groove including a slanted bottom face inclined at an elevation angle toward a half of cavity which is defined by the other mold member so as to orient the flow of the resin material toward the half of the cavity from the gate, and wherein in the slanted bottom face, an auxiliary groove is provided to cause the resin material, generally guided along the slanted bottom face, to be partially oriented toward a direction different from the general resin flow direction given by the slanted bottom face.

According to the mold in the present invention, the resin material supplied to the gate is oriented by the slanted bottom face of the gate, inclined at an elevation angle, toward that half of the cavity which is defined by the other mold member. However, since the slanted bottom face is provided with the auxiliary groove for orienting the resin material in a different direction from the direction of the resin flow by the slanted bottom face, part of the resin material supplied to the gate is thereby oriented to the other half of the cavity defined by the one mold member.

The resin flow oriented by the auxiliary groove enables the resin to flow equally into the two halves of the cavity divided by the support member. Consequently, the resin pressure in the other half cavity portion is raised to a level substantially equal to the one half cavity portion, thus compensating a difference in resin pressure between the two half cavity portions divided by the support member.

Therefore, according to the present invention, in the molding process for sealing a semiconductor device held on a plate-like support member, a resin material can be guided substantially equally into the two half cavity portions so that the whole cavity is filled substantially uniformly with the resin material. Hence, a good quality semiconductor package can be manufactured with high reliability without being subjected to a large degree of deformation such that the island portion of the support member holding a semiconductor device is exposed from the resin material.

The auxiliary groove is preferably provided near the apex of the slanted bottom face. At the apex of the slanted bottom face, there is the end portion of the gate open to the cavity, so that orienting the resin flow by the auxiliary groove can be done effectively.

The auxiliary groove may be a U-shape groove defined by the bottom face substantially parallel with the parting faces of the top and bottom mold members and also by a pair of tapered side faces divergently rising from the bottom face. The auxiliary groove in the form of this U-shape groove is advantageous in balancing the left and right portions of the resin flow along the auxiliary groove.

The auxiliary groove may be a V-shape groove defined by a pair of slanted side walls formed along the extending direction of the gate. The auxiliary groove in the form of this V-shape groove is particularly effective when the gate has a small width dimension.

The effect of the auxiliary groove can be further enhanced by giving a slope to the bottom of the auxiliary groove in the reverse direction to the sloping direction of the gate, in other words, by giving a depression angle to the bottom of the auxiliary groove toward the cavity. Because of this, the cavity can be filled more uniformly with the resin material. Since the edge formed by the slanting faces of the gate and the auxiliary groove forms the frail portion of the molded resin material, unnecessary portions of molding at the cull, the runner and the gate can be easily removed from the molded resin product without causing a breakaway to the corner portion of the molded product.

DESCRIPTION OF PREFERRED EMBODIMENTS

The present invention will be described in detail with reference to the illustrated embodiments.

Figure 1:
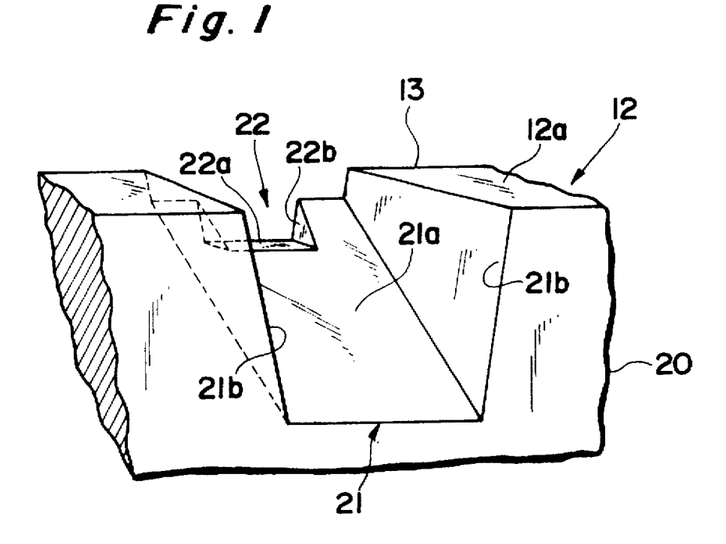
FIG. 1 is a partial perspective view, as seen from the runner, of the gate portion of a mold according to a first embodiment of the present invention.
Figure 2:
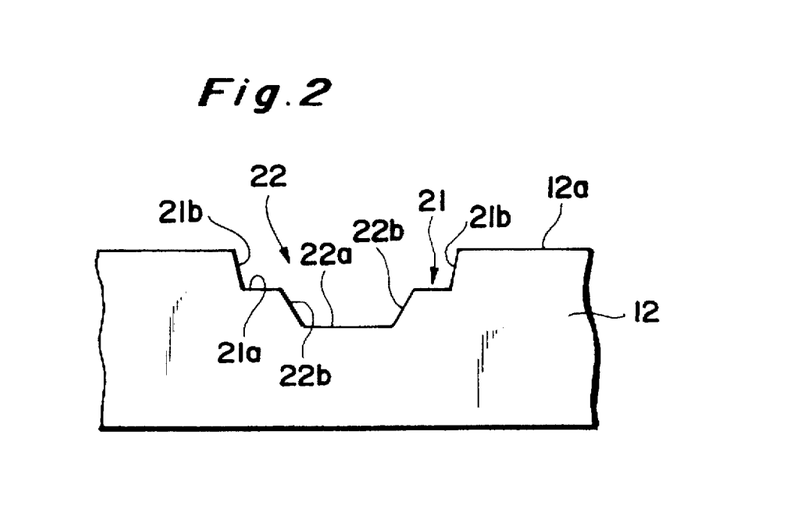
FIG. 2 is a partial side view, as seen from the cavity side, of the gate portion of the mold according to the first embodiment.
Figure 3A:
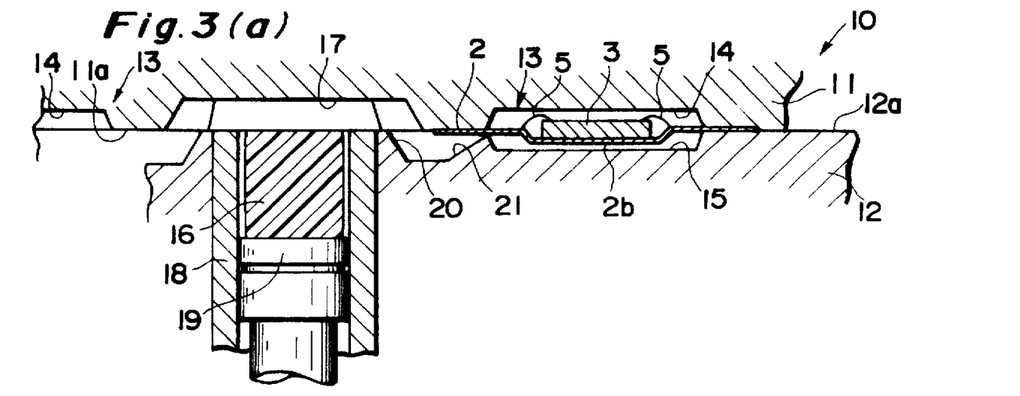
FIG. 3(a) is a longitudinal sectional view showing a setting process for molding a semiconductor package with a mold according to the present invention.
Figure 3B:
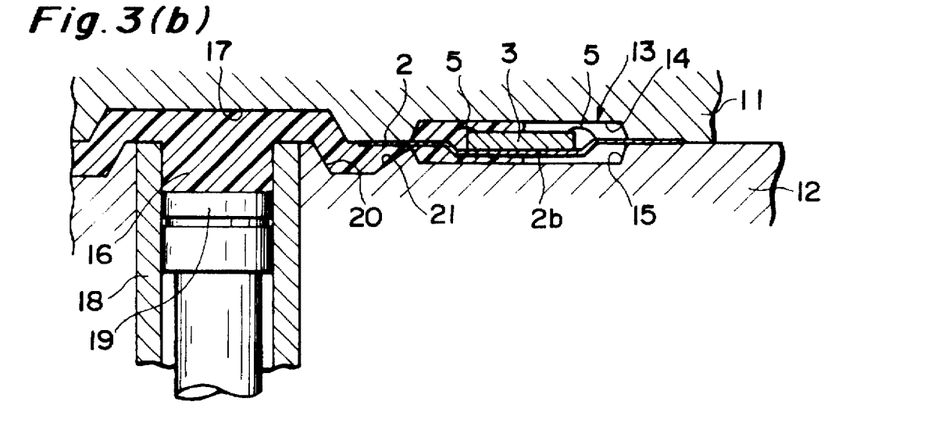
FIG. 3(b) is a longitudinal sectional view showing a resin injecting process for molding a semiconductor package using the mold according to the present invention.
Figure 3C:
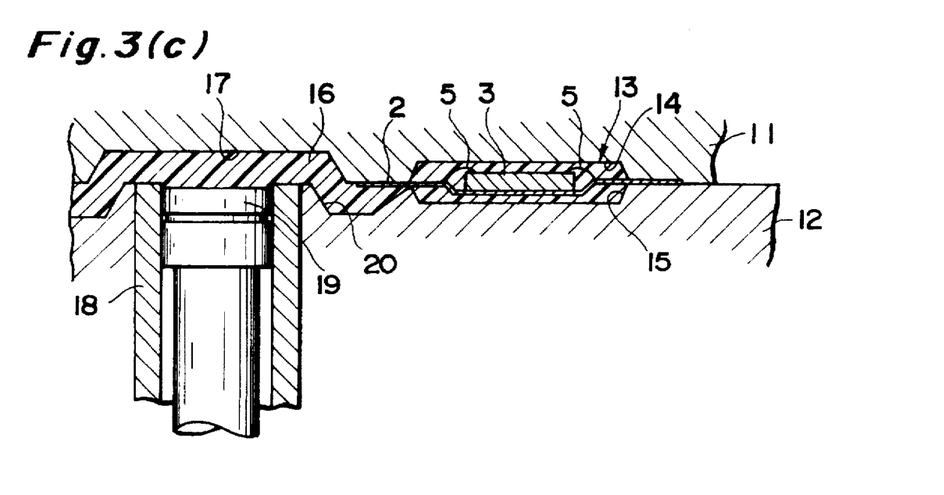
FIG. 3(c) is a longitudinal sectional view showing the completion of the resin injecting process for molding a semiconductor package with the mold according to the present invention.

FIG. 1 is a partial perspective view of the gate portion of the mold according to a first embodiment of the present invention as seen from the runner. FIG. 2 is a partial side view as sheen from the cavity side. FIGS. 3(a), 3(b) and 3(c) are process step diagrams showing the molding process of a semiconductor package with a mold according to the present invention.

As shown in FIG. 3(a), a mold 10 according to the present invention includes a top mold member 11 and a bottom mold member 12. The two mold members 11 and 12 are combined with parting faces 11a and 12a in contact with each other. In the two parting faces 11a and 12a, upper and lower cavity portions 14 and 15 are formed which define a cavity 13 in cooperation with each other.

Additionally, in the illustrated example, in the parting face 11a of the top mold member 11, a cull 17 is formed which heats and plasticizes a thermosetting resin material 16 including silica and an epoxy resin binder, for example.

On the other hand, in the illustrated example, in the bottom mold member 12, a pot 18 is formed which preheats a tablet made of thermosetting resin material 16 to transfer the tablet to the cull 17. A plunger 19 for pushing the thermosetting resin material 16 into the cull 17 is incorporated in the pot 18, which is a cylinder for the plunger 19. In the parting face 12a of the bottom mold member 12, there are provided a runner 20 for conducting outward the plasticized resin material 16 from the cull 17 to a gate 21, and the gate 21 guides the resin material 16 from the runner 20 into the cavity 13.

Runners 20, gates 21 and cavities 13 are formed in pairs symmetrically with respect to the center axis of the pot 18 or the plunger 19.

As shown in FIG. 1, the gate 21 formed in the parting face 12a of the bottom mold member 12 is in the form of a U-shaped groove extending from the runner 20 toward the cavity 13. The U-shape groove 21 is defined by a slanted bottom face 21a inclined at an elevation angle toward the upper cavity portion 14 of the cavity 13, and also by a pair of slanted side faces 21b rising in the directions away from each other from the two sides of the slanted bottom face 21a. The slanted bottom face 21a orients the flow of the resin material 16 sent from the runner 20 to the gate 21 toward the upper cavity portion 14, that is, in the sloping direction of the slanted bottom face 21a. The two slanted side faces 21b serve to prevent the flow of the resin material 16 from leaning to left or right. The pair of the slanted side faces 21b extending much wider and upwardly facilitate releasing the cured resin material 16 from the gate 21.

An auxiliary groove 22 is formed at the apex of the slanted bottom face 21a, that is, at the end portion of the gate 21 open to the cavity 13.

As shown in FIGS. 1 and 2, the auxiliary groove 22 is a U-shape groove defined by a horizontal bottom face 22a parallel with the parting face 12a of the bottom mold member 12, and a pair of tapered side faces 22b divergency rising from both sides of the horizontal bottom face.

The horizontal bottom face 22a of the auxiliary groove 22 changes the direction of part of the resin material 16, which is flowing along the slanted bottom face 21a of the gate 21 toward the upper cavity portion 14 of the cavity 13, to a horizontal direction different from the sloping direction of the slanted bottom face 21a. The two tapered side faces 21 extending much wider and upwardly, as with the slanted side faces 21b, serve to prevent the flow of the resin material 16 from leaning to left or right, and facilitate releasing the cured resin material 16 from the gate 21.

Referring to FIGS. 3(a) to 3(b), description will be made of the molding process of the semiconductor package 1 by means of a mold 10 according to the present invention.

FIG. 3(a) shows a setting process. As shown in FIG. 10(a), in the setting process, while an IC chip 3 is fixed to the island portion 2b depressed below the level of the lead frame so as to be suitable for producing a thin molded package, the lead frame member 2 is held between the parting faces 11a and 12a of both top and bottom members 11 and 12 such that the lead frame member 2 divides the cavity into two approximately equivalent halves. Electrode terminals of the IC chip 3 are connected through corresponding bonding wires 5 to corresponding lead terminals 2c as shown in FIG. 10(a). In the setting process, a tablet 16 made of a resin material is charged into the pot 18, by which the tablet is pre-heated and softens.

FIG. 3(b) shows a process of filling a resin into the cavity 13. In the resin injecting process, the softened resin material 16 is extruded into the cull 17 by the plunger 19. The resin material 16 having an adequate viscosity as it was heated to an adequate temperature in the cull 17 is guided through the runner 20 and the gate 21 into the cavity 13 by the ensuing extrusion action of the plunger 19.

In this process, the slanted bottom face 21a of the gate 21 orients the resin material 16 flowing through the gate 21 toward the upper half 14 of the cavity as mentioned above. The horizontal bottom face 22a of the auxiliary groove 22 provided at the apex of the slanted bottom face 21a of the gate 21 orients part of the resin material 16 flowing along the slanted bottom face 21a of the gate 21 to a horizontal direction.

By the guiding action of the auxiliary groove 22, part of the resin material 16 is directed toward the lower half 15 of the cavity without all of the resin material 16 being directed toward the upper half 14 above the lead frame member 2. Therefore, as shown in FIG. 3(b), the resin material 16 is guided equally to the upper half 14 and the lower half 15 of the cavity. Consequently, the resin pressure in the upper half 14 of the cavity does not show a larger value than the lower half 15 of the cavity as is the case with the conventional mold. Therefore, the lead frame member 2 is not deformed or displaced in the cavity 13 by the large resin pressure difference as in the conventional mold.

Therefore, as shown in FIG. 3(c) illustrating the completion of the resin injecting process, the lead frame member 2 and the IC chip 3 fixedly mounted on it are not swerved upward or downward. While the predetermined pressure at which the resin material 16 is filled in the cavity 13 is maintained, the plasticized resin material 16 is cured. For this reason, the island portion 2b is not exposed from the molding 4 by the deformation of the lead frame member 2, so that an adequate semiconductor package 1 is manufactured in which the IC chip 3 fixed to the island portion 2b is sealed in an adequate position approximately in the center of the molding 4.

A second embodiment of the present invention will be described.

Figure 4:
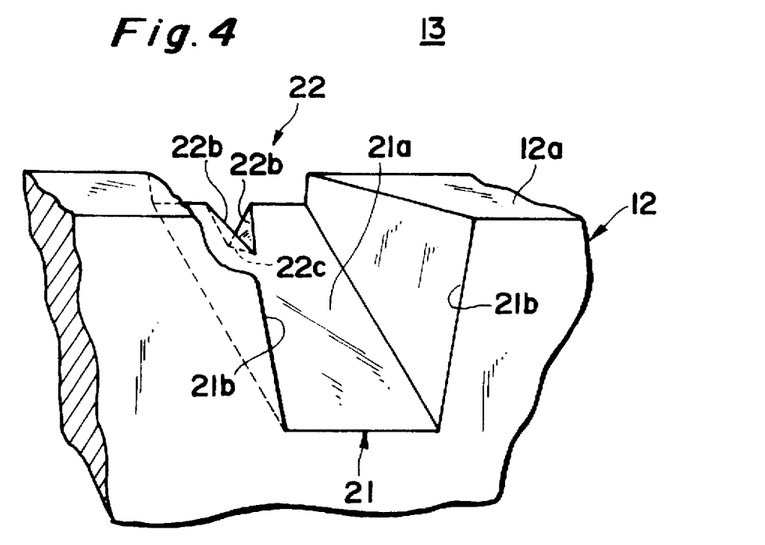
FIG. 4 is a diagram similar to FIG. 1, which shows a second embodiment of the present invention.
Figure 5:
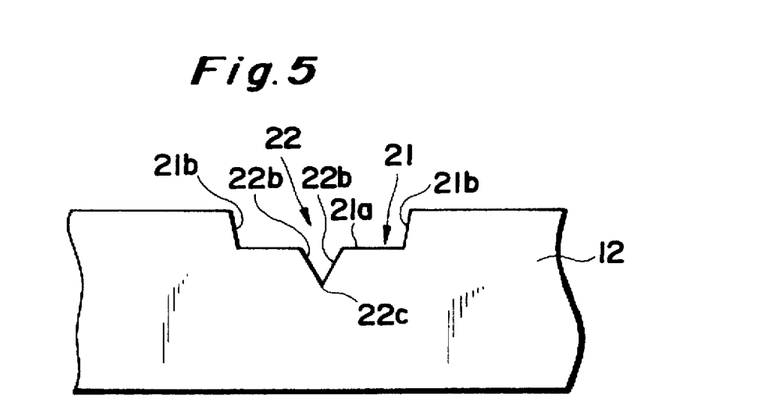
FIG. 5 is a diagram similar to FIG. 2, which shows the second embodiment of the present invention.

In FIGS. 4 and 5 are diagrams in the second embodiment, which correspond to FIGS. 1 and 2 in the first embodiment.

In the example shown in FIGS. 4 and 5, the auxiliary groove 22 is a V-shape groove defined by a pair tapered side faces 22b. The bottom portion 22c of the auxiliary groove 22, expressed by a line of intersection of the two slanted side faces 21b, is parallel with the parting line 12a.

Therefore, the auxiliary groove 22, which is a V-shape groove, serves to orient, to the lower half 15 of the cavity, part of the flow of the plasticized resin material 16 oriented to move toward the upper half 14 of the cavity along the slanted bottom face 21a of the gate 21 as with the auxiliary groove 22 shown in FIGS. 1 and 2. Consequently, the lead frame member 2 can be securely prevented from being deformed or displaced by the difference in resin pressure between the two halves of the cavity.

With the V-shape auxiliary groove 22, the horizontal bottom face 22a in the U-shape groove 22 shown in FIGS. 1 and 2 is not required. Therefore, the V-shape auxiliary groove 22 is suitable for use in combination with a gate 21 in the form of a narrow groove, which has the slanted bottom face 21a with a small width.

A third embodiment of the present invention will now be described.

Figure 6:
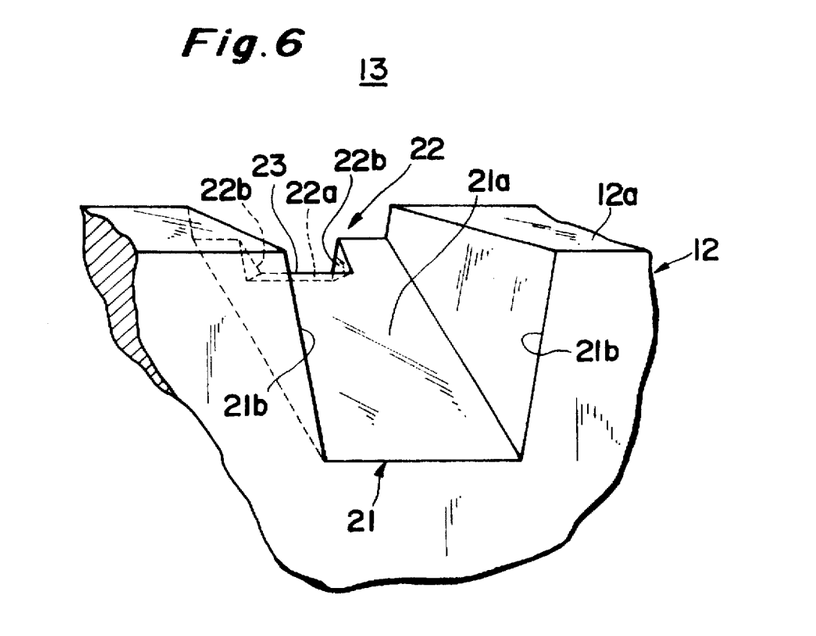
FIG. 6 is a diagram similar to FIG. 1, which shows a third embodiment of the present invention.
Figure 7:
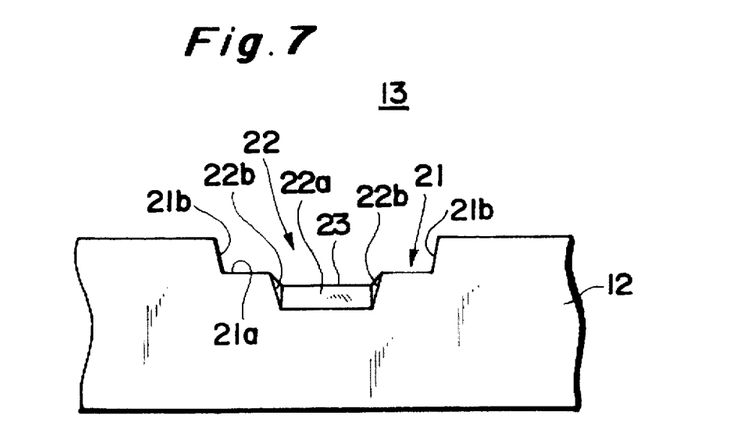
FIG. 7 is a diagram similar to FIG. 2, which shows the third embodiment of the present invention.

FIGS. 6 and 7 are diagrams in the third embodiment, which correspond to FIGS. 1 and 2 in the first embodiment.

In the example shown in FIGS. 6 and 7, the auxiliary groove 22 is a U-shape groove defined by a bottom face 22a and a pair of tapered side faces 22b as in the example shown in FIGS. 1 and 2. In the third embodiment, however, the bottom face 22a is not parallel with the parting face 12a but inclined in the reverse direction to the direction of the slanted bottom face 21a, that is, inched at an elevation angle toward the lower half 15 of the cavity 13.

Therefore, the bottom face 22a is inched in the reverse direction to the direction of the slanted bottom face 21a to more positively form a strong flow of the resin material 16 toward the lower half 15 of the cavity, for which reason the resin material 16 can be injected evenly into the upper half 14 and the lower half 15 of the cavity in a more balanced manner. Accordingly, the deformation and the displacement of the lead frame member 2 due to the difference in resin pressure between the two halves of the cavity can be prevented more securely.

The edge 23 defined by a line of intersection of the bottom face 22a and the slanted bottom face 21a forms a frail portion of the cured resin material 16 at an external portion of the molding 4 outside the cavity 13 Therefore, when portions of molding at the cull, the runner and the gate are removed from the main body of the molded product 4, unnecessary portions of molding at the cull, the runner and the gate of the molding can be removed easily without causing a breakaway to the corner portion of the molding 4.

A fourth embodiment of the present invention will next be described.

Figure 8:
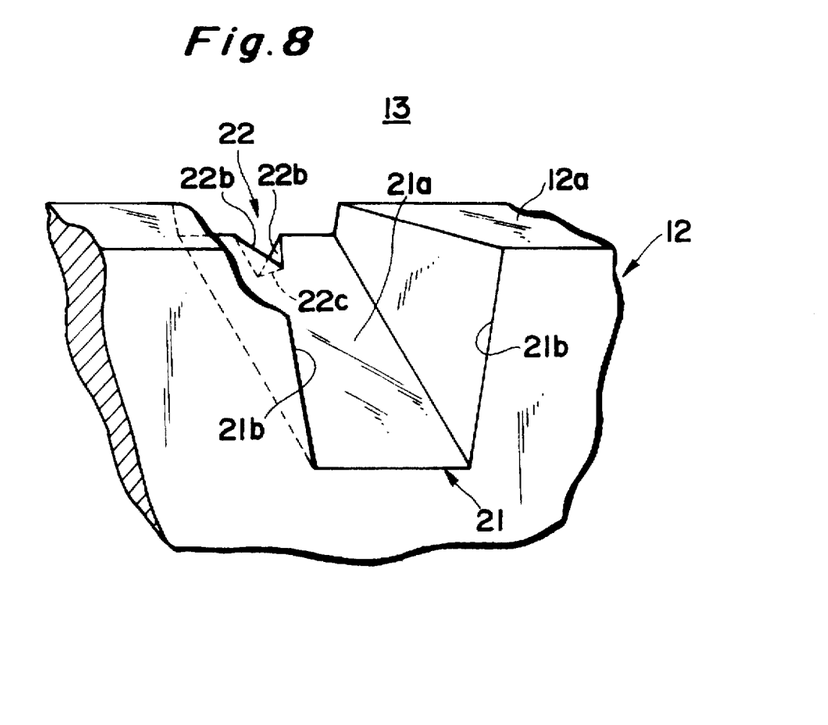
FIG. 8 is a diagram similar to FIG. 1, which shows a fourth embodiment of the present invention.
Figure 9:
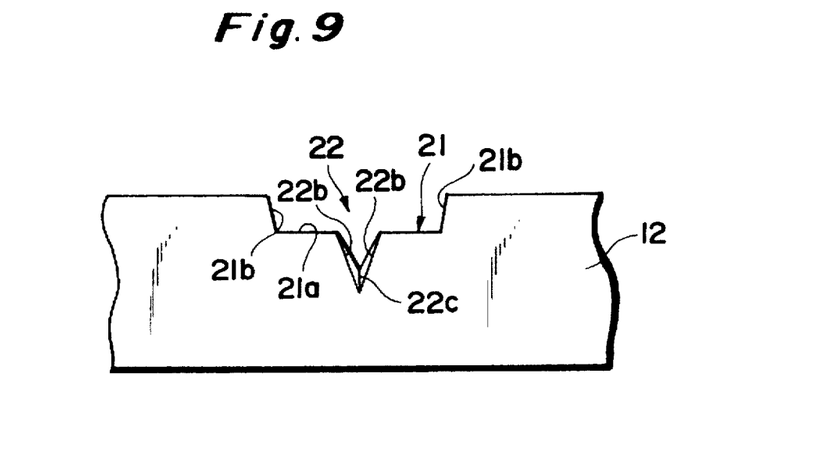
FIG. 9 is a diagram similar to FIG. 2, which shows the fourth embodiment of the present invention.

FIGS. 8 and 9 diagrammatically correspond to FIGS. 1 and 2, and show a fourth embodiment in which the V-shape auxiliary groove 22 is inclined in the reverse direction to the direction of the slanted bottom face 21a.

In the embodiment shown in FIGS. 8 and 9, the bottom 22c, which is defined by the intersection of a pair of tapered side faces 22b which define the V-shape groove 22, is inclined at an elevation angle toward the lower half 15 of the cavity 13.

Therefore, according to the fourth embodiment, like in the third embodiment, it is possible to more positively form a strong flow of the resin material 16 to the lower half 15 of the cavity. Thus, the resin material 16 can be injected more evenly into the upper half 14 and the lower half 15 of the cavity in a more balanced manner. Consequently, it is possible to more securely prevent the deformation and the displacement of the lead frame member 2 due to the difference in resin pressure between the two halves of the cavity. Moreover, this embodiment is advantageous when it is applied to the gate 21 having a slanted bottom face 21a with a narrow width. Furthermore, as described in the third embodiment, unnecessary portions of molding at the cull, the runner and the gate can be removed easily without causing a breakaway to the corners of the molding 4.

In the above description, the auxiliary grooves for changing the direction of the flow of part of the resin material flowing through the gate 21 have been U-shape grooves defined by the bottom face 22a and a pair of the tapered side faces 22b or V-shape grooves defined by a pair of the tapered side faces 22b. Instead of those types of grooves, an auxiliary groove with any other type of cross section, a circular cross section, for example, may be provided near the apex of the slanted bottom face and along the slanted bottom face of the gate.

The examples in which a single auxiliary groove is formed at the apex of the slanted bottom face of the gate, but a plurality of auxiliary grooves may be formed in parallel with each other, if needed.

In addition, the present invention can be applied to molds wherein an auxiliary resin supply port to serve as an auxiliary means for the gate is formed in the mold member other than the mold member which has the gate formed therein.

It ought to be noted that the present invention is not limited to the embodiments described above, and various modifications and variations can be made in the present invention without departing from the spirit of the present invention and are not excluded from the scope of the present invention.

What is claimed is:

1. A mold for molding a semiconductor package comprising:

a pair of mold members for cooperatively holding therebetween a plate-form support member to retain a semiconductor device thereon and for cooperatively defining a cavity surrounding the semiconductor device, the pair of molding members having parting faces in contact with each other; and a gate for guiding a resin molding material into the cavity, the gate being formed in the parting face of at least one of the pair of mold members, wherein the gate is defined by a groove including a slanted bottom face inclined at an elevation angle to a haft of the cavity which is defined by the other mold member so as to orient the flow of the resin material toward the half of the cavity, and wherein in the slanted bottom face, an auxiliary groove is provided to cause the resin material, generally guided along the slanted bottom face, to be partially oriented to a direction different from the general resin flow direction given by the slanted bottom face.

2. A mold according to claim 1, wherein the auxiliary groove is arranged near the apex of the slanted bottom face.

3. A mold according to claim 1, wherein the auxiliary groove is formed at an opening portion of the gate to the cavity.

4. A mold according to claim 1, wherein the auxiliary groove is a U-shape groove defined by a bottom face substantially parallel with the parting face and a pair of side faces rising from both sides of the bottom face in the directions away from each other.

5. A mold according to claim 1, wherein the auxiliary groove is a V-shape groove defined by a pair of slanted side walls formed along the extending direction of the gate.

6. A mold according to claim 1, wherein the bottom portion of the auxiliary groove is inclined in a reverse direction with respect to the slanting direction of the slanted bottom face of the gate.

7. A mold according to claim 1, wherein the auxiliary groove orients part of the resin material, supplied to the gate, toward the other half portion of the cavity, defined by the one mold member.

8. A mold according to claim 1, wherein the resin material is a thermosetting synthetic resin material.

9. A mold according to claim 1, wherein the mold is a mold for transfer resin molding.

10. A mold according to claim 1, wherein the semiconductor device is an IC chip and the plate-form member is a lead frame member having an island portion on which the IC chip is fixed.

* * * * *